(12) United States Patent
Abt

(10) Patent No.: US 7,393,055 B2
(45) Date of Patent: Jul. 1, 2008

(54) VEHICLE SEAT, ESPECIALLY AIRCRAFT PASSENGER SEAT

(75) Inventor: Hans Dieter Abt, Scheidegg (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 314 days.

(21) Appl. No.: 11/105,577

(22) Filed: Apr. 14, 2005

(65) Prior Publication Data

US 2005/0269844 A1  Dec. 8, 2005

(30) Foreign Application Priority Data

Apr. 15, 2004  (DE)  ............... 10 2004 019 299

(51) Int. Cl.
*A47C 1/00*  (2006.01)
*B64D 11/06*  (2006.01)

(52) U.S. Cl. .............................. 297/344.14; 297/344.17

(58) Field of Classification Search ............ 297/344.14, 297/344.16, 344.17, 344.1, 344.11, DIG. 10
See application file for complete search history.

(56) References Cited

U.S. PATENT DOCUMENTS

| | | | | |
|---|---|---|---|---|
| 4,249,774 A | * | 2/1981 | Andreasson | ................ 297/311 |
| 6,309,020 B1 | * | 10/2001 | Niikura et al. | ........... 297/344.1 |
| 6,517,157 B1 | * | 2/2003 | Vorac | ..................... 297/344.13 |
| 6,578,920 B2 | * | 6/2003 | Delmas et al. | ......... 297/344.17 |
| 7,066,539 B2 | * | 6/2006 | Hatta et al. | ............ 297/344.14 |

FOREIGN PATENT DOCUMENTS

| | | |
|---|---|---|
| DE | 100 19 484 | 10/2001 |
| EP | 1 074 468 | 10/2003 |
| WO | WO 03/013903 | 2/2003 |

* cited by examiner

*Primary Examiner*—Joe Edell
(74) *Attorney, Agent, or Firm*—Roylance, Abrams, Berdo & Goodman, L.L.P.

(57) ABSTRACT

A vehicle seat, especially an aircraft passenger seat, has at least one seat component which can be adjusted in its position, such as a seat part. The seat part can be mounted with its seat frame structure (3) by swivelable support legs (7, 11) above a floor structure (1). The support legs (7, 11) act on the seat frame structure (3) in pairs in the area of the front edge (9) and rear edge (5) of the seat of the seat part. An actuating mechanism is connected by action to a pair of support legs (7, 11) for producing a swiveling motion of the support legs (7, 11) causing a change in the position of the seat part. The actuating mechanism is coupled to the assigned pair of support legs (7, 11) by a differential mechanism (13) which converts the swiveling motion of the support legs (11) into a change of the effective length of the assigned pair of support legs (11). The length determines the vertical distance between the seat frame structure (3) and the floor structure (1).

8 Claims, 4 Drawing Sheets

VEHICLE SEAT, ESPECIALLY AIRCRAFT PASSENGER SEAT

FIELD OF THE INVENTION

The present invention relates to a vehicle seat, especially an aircraft passenger seat, with at least one seat component which can be adjusted in its position. A seat part can be mounted with its seat frame structure by swivelable support legs above a floor structure. The support legs act on the seat frame structure in pairs in the area of the front edge and rear edge of the seat of the seat part. An actuating mechanism, connected by action to a pair of support legs, produces a swiveling motion of the support legs causing a change in the position of the seat part.

BACKGROUND OF THE INVENTION

Vehicle seats are known with seat components which are adjustable in their position. Thus, for example, DE 101 07 197 A1 discloses a seat of this type in the form of an aircraft passenger seat.

In vehicles for commercial conveyance of passengers, specifically in commercial aviation aircraft, only a limited installation space is available for seating. In other words, especially for economic reasons, an especially compact construction of the seats is desired. On the other hand, high demands can be imposed on functionality and the comfort to be afforded the seat occupant, especially in aircraft passenger seats for business class or first class. With respect to these requirements, known seats have a plurality of control, actuating and adjustment mechanisms, resulting in a complex structure. In the limited space between the seat frame structure and the floor structure, very little free installation space is available. Therefore, it is difficult or impossible to freely choose the geometry of the pairs of support legs and/or the geometrical locations of their coupling points to the seat frame structure and the floor structure, such that the desired change in the position of the seat part occurs when swiveling motions of the pairs of support legs are caused by the actuating mechanism.

SUMMARY OF THE INVENTION

An object of the present invention is to provide a vehicle seat which provides greater freedom of design in the configuration of the pairs of support legs, and, at the same time, provides adjustment of the position of the seat part in the desired manner.

This object is achieved according to the present invention by a vehicle seat having a differential mechanism which changes the effective length of an assigned pair of support legs depending on their swiveling motion. The length determines the vertical distance between the seat frame structure and the floor structure. Each adjustment of the position of the seat part desired can be achieved as a result of the swiveling motion of the support legs, without being tied to a certain geometry of the support legs or articulated connections. Greater freedom is provided with respect to the use of the limited free installation space available, because depending on circumstances the most favorable positional arrangement of the support legs can be selected.

In a seat in which the seat part can be adjusted between an initial position which is the rear position relative to the direction of travel and an end position which is displaced forward, by the differential mechanism, the effective length of the support pair connected to it can be matched to the effective length of the other support pair which can be changed when the position is adjusted. Without being tied to a certain geometry of the configuration and attachment of the support legs, this arrangement ensures that the entire adjustment motion of the seat part between the initial position and the end position takes place without any change of the tilt relative to the floor structure, i.e., over the entire adjustment path a horizontal position of the seat part is maintained.

The differential mechanism can be formed by a mechanical lever mechanism.

Preferably the lever mechanism for each support leg of the assigned pair has a bell crank lever. One lever arm of the lever mechanism is articulated to the end of the pertinent support leg, which end is adjacent to the floor structure. The other lever arm is articulated to the floor structure. In one preferred exemplary embodiment, the two bell crank levers are permanently connected for common motion with one another by a shaft extending through between the support legs from one bell crank lever to the other bell crank lever.

In these exemplary embodiments, the actuating mechanism can have a controllable power drive which acts on the shaft, and applies an actuating force with the bell crank levers which are connected to it. This force produces a torque for the swiveling motion of the bell crank levers around their coupling point to the floor structure. The controllable power drive can be a linear drive with a driving element, for example, in the manner of a piston rod, which is articulated at a distance from the axis of the shaft to a projection which extends away from the shaft.

In the exemplary embodiments in which an actuating force can be applied to the bell crank levers by the power drive of the actuating mechanism and causes a displacement motion of the seat part forward by the assigned pair of support legs, there is preferably a second power drive acting on the shaft with an opposing actuating force to apply a reset force to the bell crank levers. This reset force seeks to produce a displacement motion of the seat part backwards. Advantageously, the second power drive makes available an auxiliary force which, when the first power drive is deactivated or when the first power drive has failed, makes it possible for the seat part which has been pushed forward to be reset into the rear initial position by manual intervention without a greater expenditure of force being necessary for this purpose.

An energy accumulator, especially in the form of a pressurized spring, can be provided as the second power drive.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
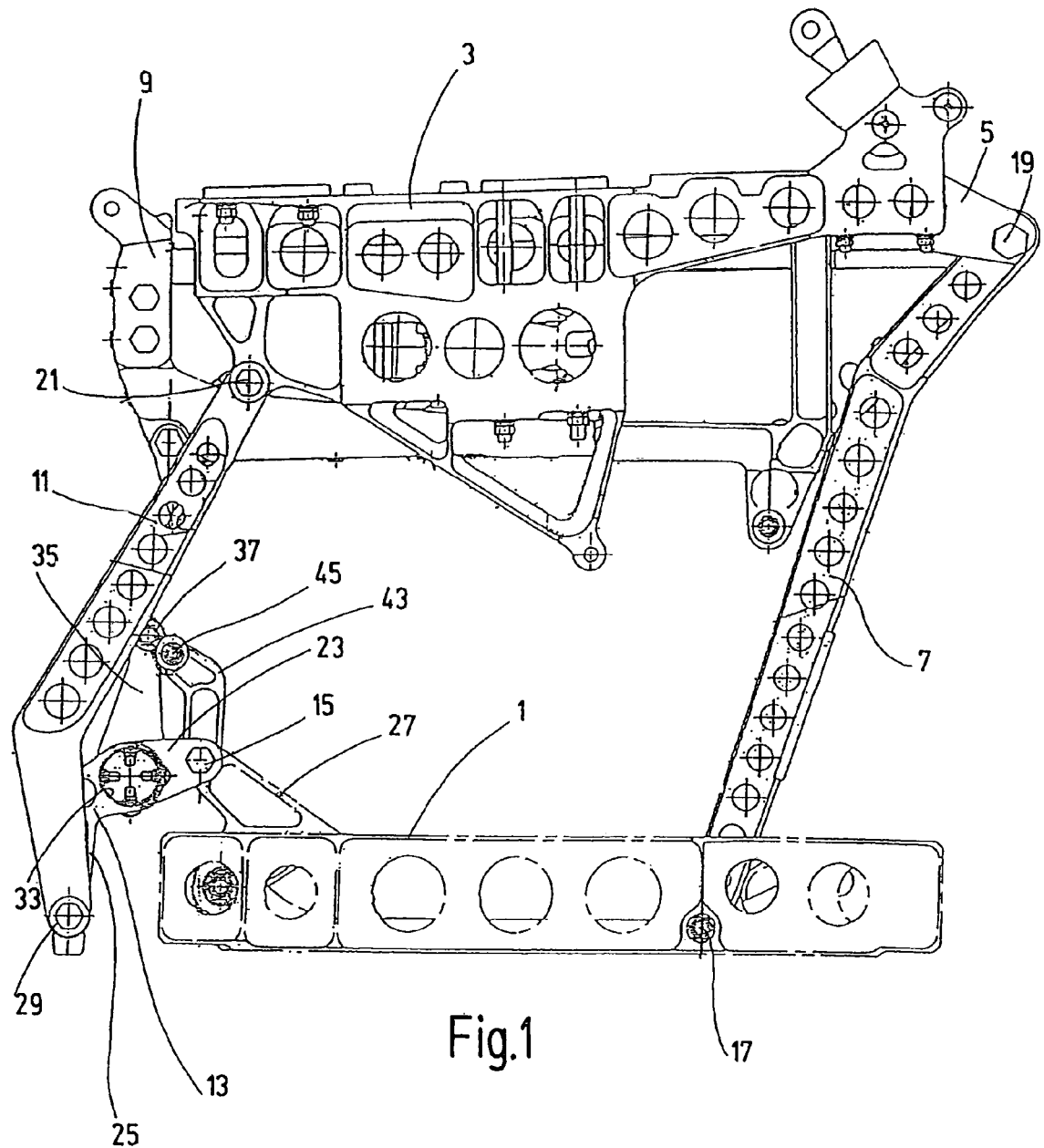
FIG. 1 is a side elevational view of the seat frame structure on a vehicle seat according to an embodiment of the present invention which has been mounted above a floor structure in the form of a aircraft passenger seat, all other means which are housed in the space underneath the seat frame and which are part of the operating system of the seat being omitted for the sake of clarity and the illustrated components being shown in the position which corresponds to the rear initial position of the seat part.

In the figures, the vehicle seat of the present invention is explained using one embodiment which is an aircraft passenger seat. FIG. 1 shows only the floor structure 1 which is to be mounted above the cabin floor. The seat frame structure 3 is mounted above the floor structure. Pairs of support legs bear the seat frame structure 3. For each pair of support legs, only the support leg facing the viewer being visible. The rear pair acts on the seat frame structure 3 on its back end area 5 and has a support leg 7. The visible support leg 11 of the front pair acts on the front end area 9 of the seat frame structure. These front support legs 11 are each connected to the floor structure 1 by a bell crank lever 13 which is articulated to the leg and which forms an articulated lengthening of the respective support leg 11, at a coupling point 15. The support legs 7 of the rear pair are connected to the floor structure 1 at a coupling point 17. The opposite, top ends of the support legs 7 and 11 are coupled to the seat frame structure 3 by coupling points 19 for the rear support legs 7 and by coupling points 21 for the front support legs 11.

As can readily be seen from the figures, the arms 23 and 25 of the bell crank levers 13 are oriented at an obtuse angle relative one another, with the arm 23 forming the coupling point 15 for connection to the floor structure 1 on a shoulder 27 of the floor structure 1. Shoulder 27 projects obliquely upward. The other, longer arm 25 of the bell crank levers 13 is connected by an articulation point 29 to the bottom end of the assigned support leg 11. As can readily be seen from FIG. 4, the two bell crank levers 13 are permanently or fixedly connected to one another for common motion by a shaft 31. Shaft 31 extends through between the support legs 11 perpendicular to the plane of the drawing of FIGS. 1 to 3, so that in these figures only the front end 33 can be seen.

Figure 4:
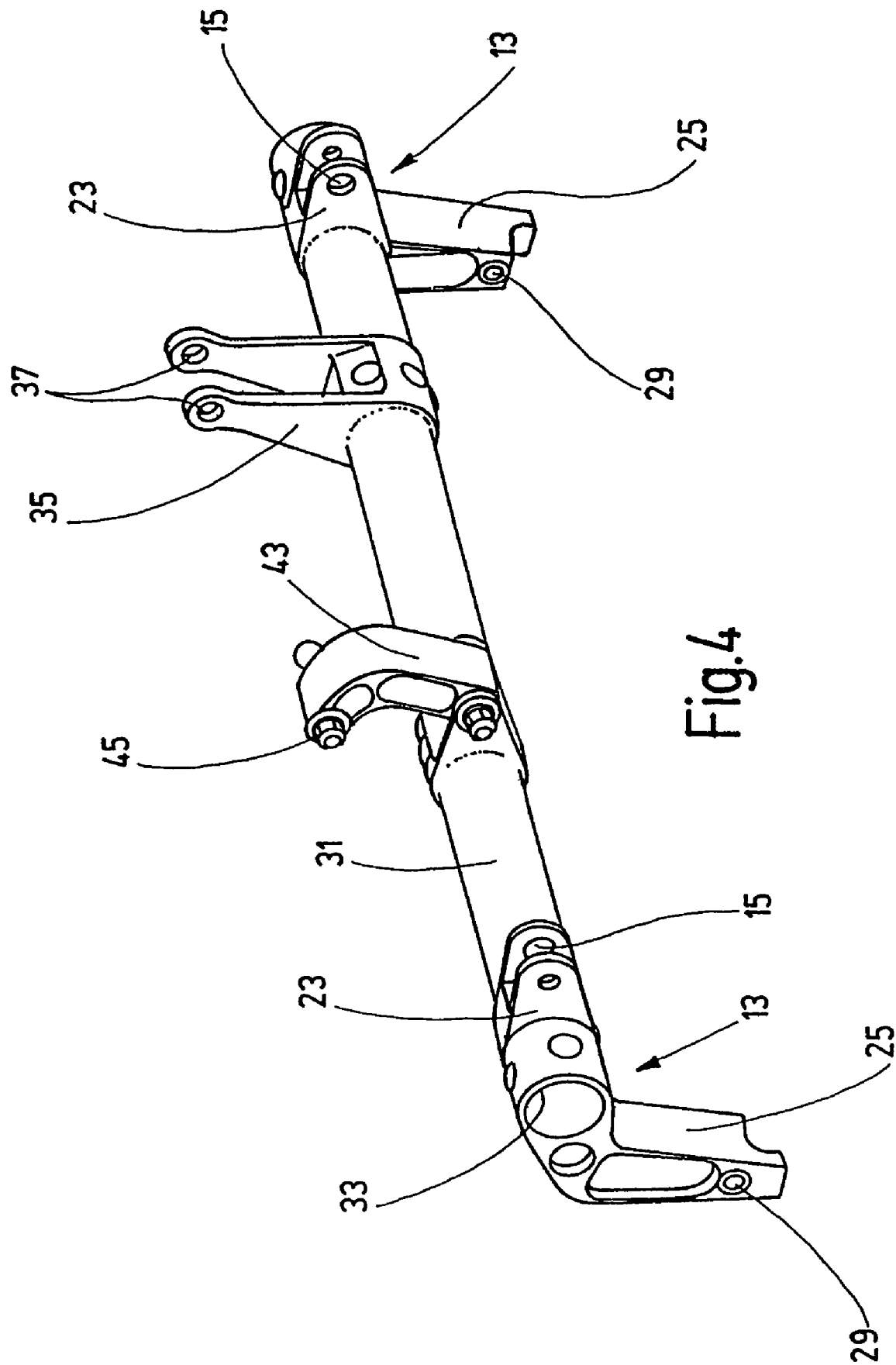
FIG. 4 is a perspective oblique view of one connecting shaft only between the bell crank levers of a differential mechanism of the exemplary embodiment, which levers are attached to the shaft on the end.

As is most clearly shown in FIG. 4, the shaft 31, between the bell crank levers 13, has a projection 35 with an end area which forms an articulation point 37 for articulated connection to the piston rod-like driving element 39 of a controllable linear drive 41. Activation of the linear drive 41 causes a retraction movement of the piston rod-like driving element 39. FIG. 1, which shows the components in the rear initial position, illustrates the position of the articulation point 37 on which the driving element 39 of the power drive 41, which is not shown in FIG. 1, acts in the position which corresponds to the fully extended position of the driving element 39. When the power drive 41 is actuated, the retraction motion of the driving element 39 causes the articulation point 37 of the projection 35 of the shaft 31 to move out of the position shown in FIG. 1 to the right. This movement causes rotary motion of the unit formed from the shaft 31 and the bell crank levers 13 clockwise around the coupling point 15.

Figure 2:
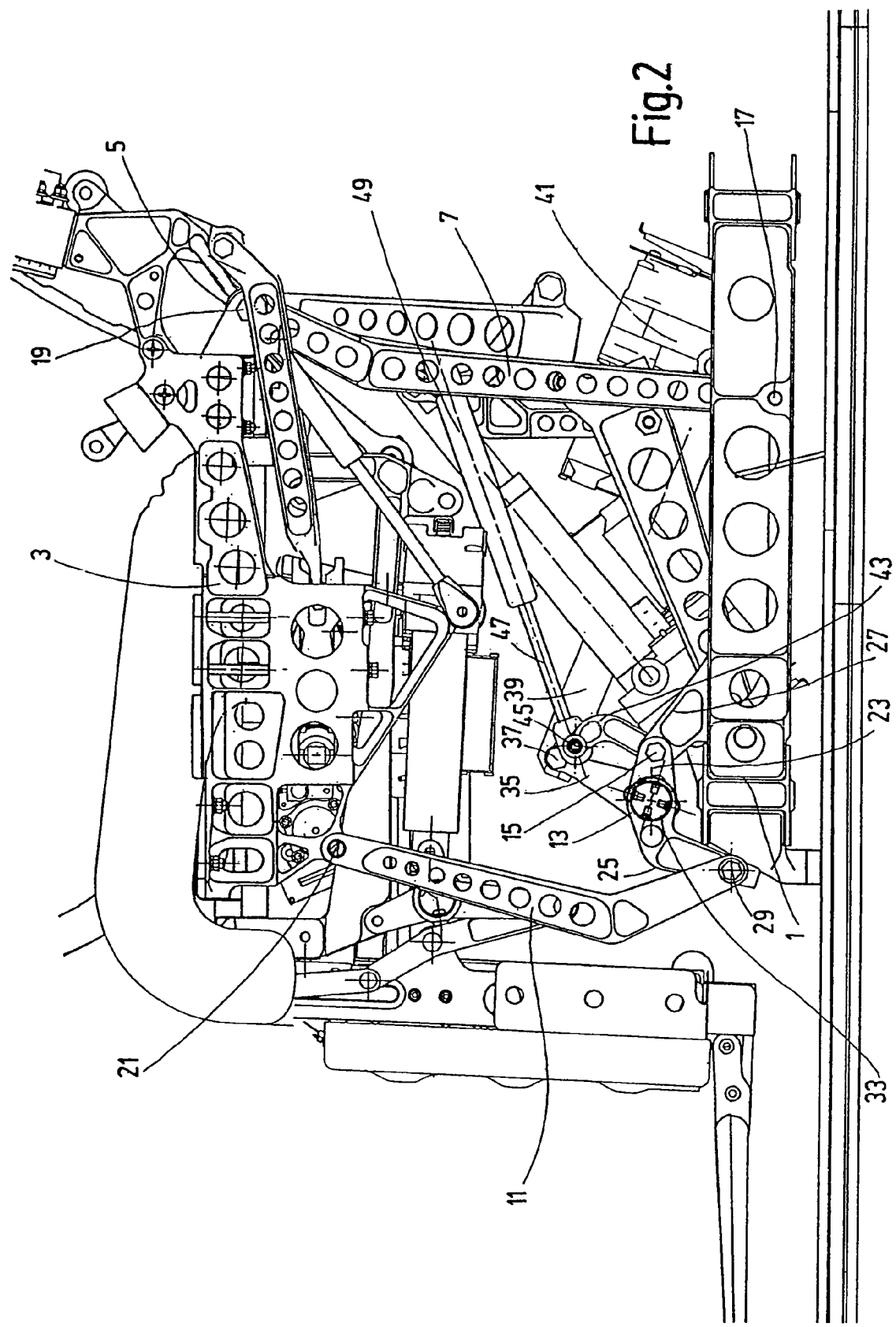
FIG. 2 is a side elevational view similar to FIG. 1, however, the other means which belong to the seat area and which are omitted in FIG. 1 being shown and the seat frame structure and the pair of support legs being shown in the position which is pushed forward out of the rear initial position into a middle position.

FIG. 2 shows the middle position in which the driving element 39 of the linear drive 41 is partially retracted so that the bell crank levers 13 are swiveled slightly clockwise out of the position shown in FIG. 1. As a comparison of FIGS. 1 and 2 shows, the effective length of the front support legs 11, i.e., the distance between the coupling point 21 to the seat frame structure 3 and the floor structure 11, which distance is dictated by the support legs 11, is increased slightly. At the same time, a displacement motion of the seat frame structure 3 forward (to the left in the drawings) has taken place, so that the rear support legs 7 have moved into a steeper position relative to the position in FIG. 1. The increase of the effective length of the support legs 7 resulting from the change of their position is equalized as a result of the aforementioned swiveling motion of the bell crank levers 13. Specifically, the differential drive, which is formed by the bell crank levers 13, has matched the effective lengths of the front support legs 11 and the rear support legs 7 to one another so that the displacement motion of the seat frame structure 3 has taken place without any tilt.

Figure 3:
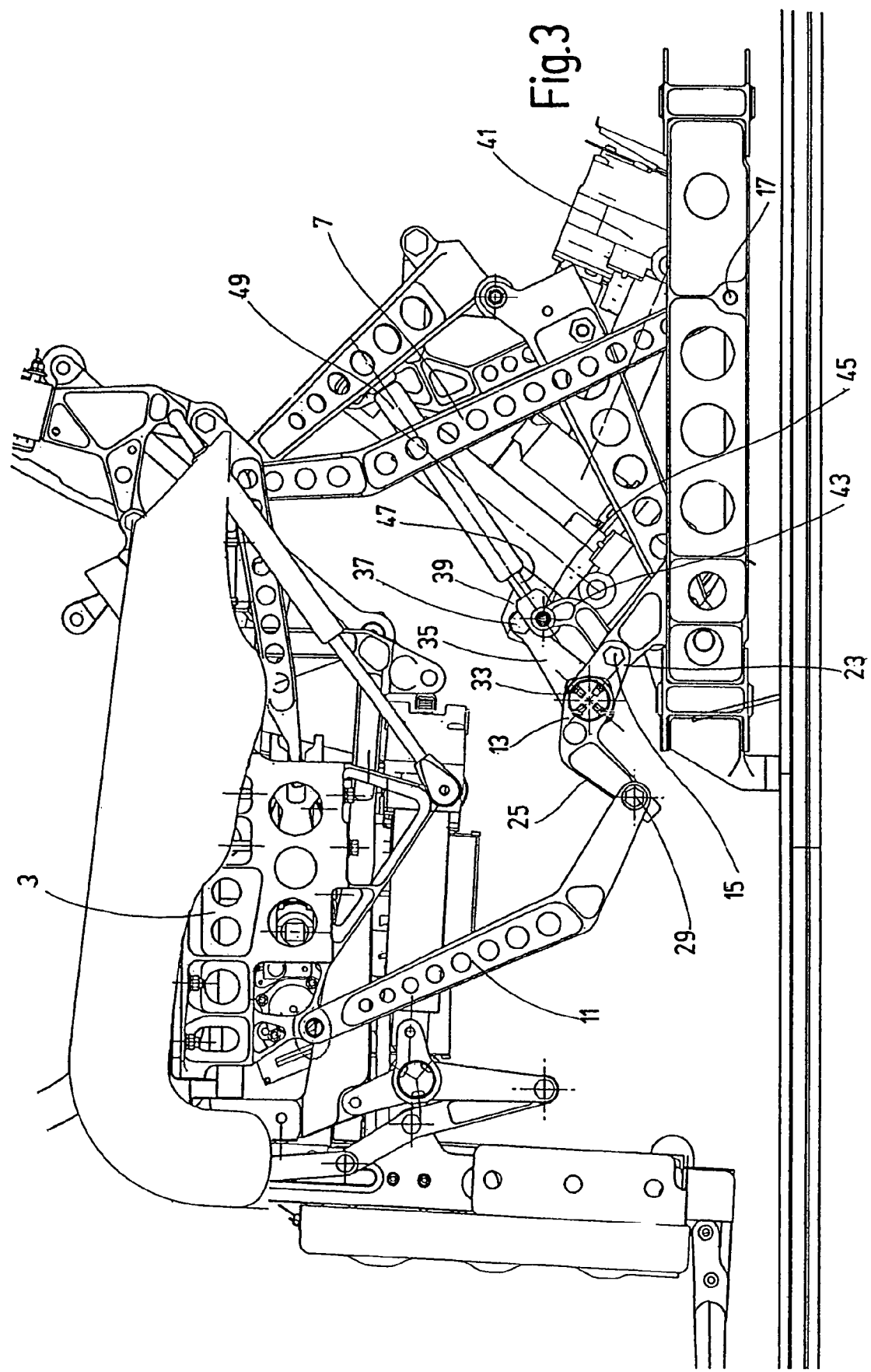
FIG. 3 is a side elevational view corresponding to FIG. 2 in which the front end position is shown.

FIG. 3 shows the components in the front end position, with the driving element 39 of the linear drive 41 being completely retracted. Thus, the shaft 31 with the bell crank lever 13 is swiveled further clockwise around the coupling point 15. The resulting change in the position of the coupling point 29 on the arm 25 of the bell crank lever 13 causes a corresponding lengthening of the front support legs 11 for equalization of the other, in turn corresponding change of the effective length which resulted for the rear support legs 7. Thus, due to the differential mechanism the entire displacement motion of the seat frame part 3 takes place without a change in tilt.

FIGS. 2 to 4 show another shoulder 43 which is located next to the projection 35 on the shaft 31. The push rod 47 of another or reset power drive in the form of a pressurized spring 49 is coupled to the end 45 of shoulder 43. Push rod 47 applies an actuating force to the shaft 31. This force opposes the actuating force generated by the linear drive 41. The strength of this reset force or auxiliary force is chosen such that when the linear drive 41 is deactivated or has failed, the seat frame structure 3, and thus the seat part, can be pushed manually back into the rear initial position without a greater expenditure of force being necessary for this purpose.

Use of the present invention for several seats located behind one another in a row, as a result of the horizontal adjustment geometry of the seat part in the forward position, it is possible to reach the rear area (seat back) of a seat or seat component, which rear area is located in the row in front. In this way, the operating elements located in that rear area can be used, such as, for example, folding table units, display units and the like. As has previously been disclosed, in the first class section, the seats are located at greater distances to one another in a longitudinal row. Without the solution of the present invention, the assignable operating units of the preceding seat could not be used. Furthermore, it is possible, for two vehicle seats which are located immediately adjacent to one another transversely to the indicated longitudinal row, to continuously adjust the respective adjacent seat parts horizontally against one another. A lateral offset is achieved such that seat occupants who are sitting next to one another enjoy increased freedom, especially with respect to the adjacent arm area.

While one embodiment has been chosen to illustrate the invention, it will be understood by those skilled in the art that various changes and modifications can be made therein without departing from the scope of the invention as defined in the appended claims.

What is claimed is:

1. A vehicle seat, comprising:
   a seat part mounted on a seat frame, said seat frame having front and rear edges and being movable between an initial rear position and an end forward position relative to a vehicle travel direction;

a floor structure;

front and rear pairs of support legs pivotally coupled to said seat frame adjacent said front and rear edges, respectively, and to said floor structure; and an actuating mechanism connected to one pair of said front and rear pairs of said support legs by a differential mechanism converting pivoting of said one pair into a change of effective lengths of said support legs of said one pair determining vertical distances between said seat frame and said floor structure, said differential mechanism matching said effective lengths of said support legs of said one pair to effective lengths of the other pair of said support legs, said effective lengths of said other pair of said support legs being changeable upon movement of said seat frame, said differential mechanism having a mechanical bell crank lever for each of said support legs of said one pair, each said bell crank lever having a first arm articulated to an end of the respective support leg adjacent said floor structure and a second arm articulated to said floor structure;

whereby, all adjustment motion of said seat frame between said rear position and said forward position occurs without tilting of said seat frame relative to said floor structure.

2. A vehicle seat according to claim 1 wherein said first and second arms of each said bell crank lever are angularly separated by an obtuse angle and are fixedly connected to each other at distances from coupling points thereof to the respective support leg and to said floor structure by a shaft extending between said support legs of said one pair to impart common motion to said bell crank levers.

3. A vehicle seat according to claim 2 wherein said actuating mechanism comprises a controllable power drive coupled to and acting on said shaft, and thereby coupled to and acting on said bell crank levers, to produce torque for pivoting said bell crank levers about said coupling points thereof to said floor structure.

4. A vehicle seat according to claim 3 wherein said power drive is a linear drive having a driving element articulated at a distance from a rotational axis of said shaft to a projection extending radially away from said shaft.

5. A vehicle seat according to claim 3 wherein said linear drive applies an actuating force to said bell crank levers to displace said seat frame part forwardly from said rear position by movement of said support legs of said one pair.

6. A vehicle seat according to claim 2 wherein a reset power drive is coupled to and acts on said shaft biasing said bell crank levers and thereby said support legs of said one pair and thereby said seat frame structure towards said rear position.

7. A vehicle seat according to claim 6 wherein said reset power drive includes an energy accumulator.

8. A vehicle seat according to claim 7 wherein said energy accumulator is a pressurized spring.

* * * * *